March 13, 1934. M. L. PRESTON 1,951,257
PORTABLE ELECTRIC CHOCOLATE DIPPING PAN
Filed June 14, 1932    2 Sheets-Sheet 2
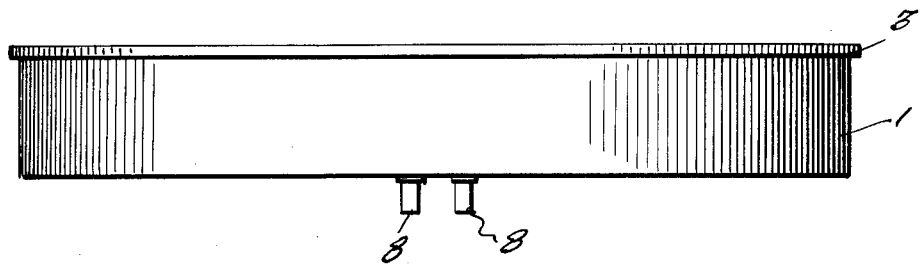
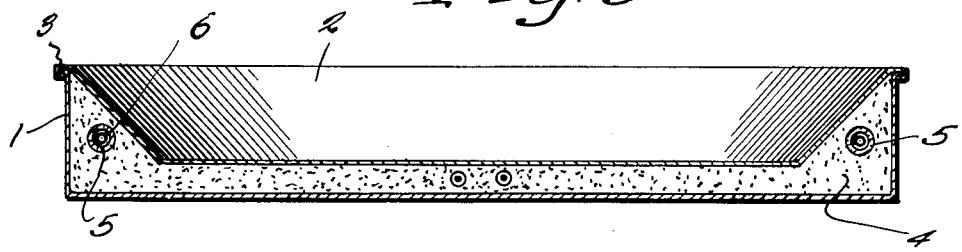
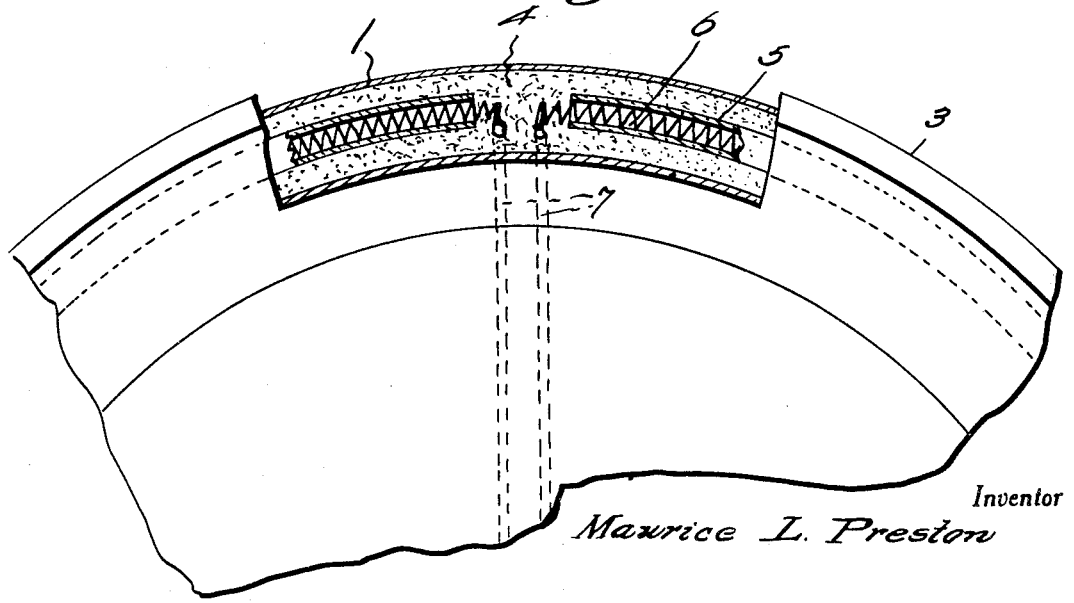
Inventor
Maurice L. Preston
By Clarence A. O'Brien
Attorney Patented Mar. 13, 1934

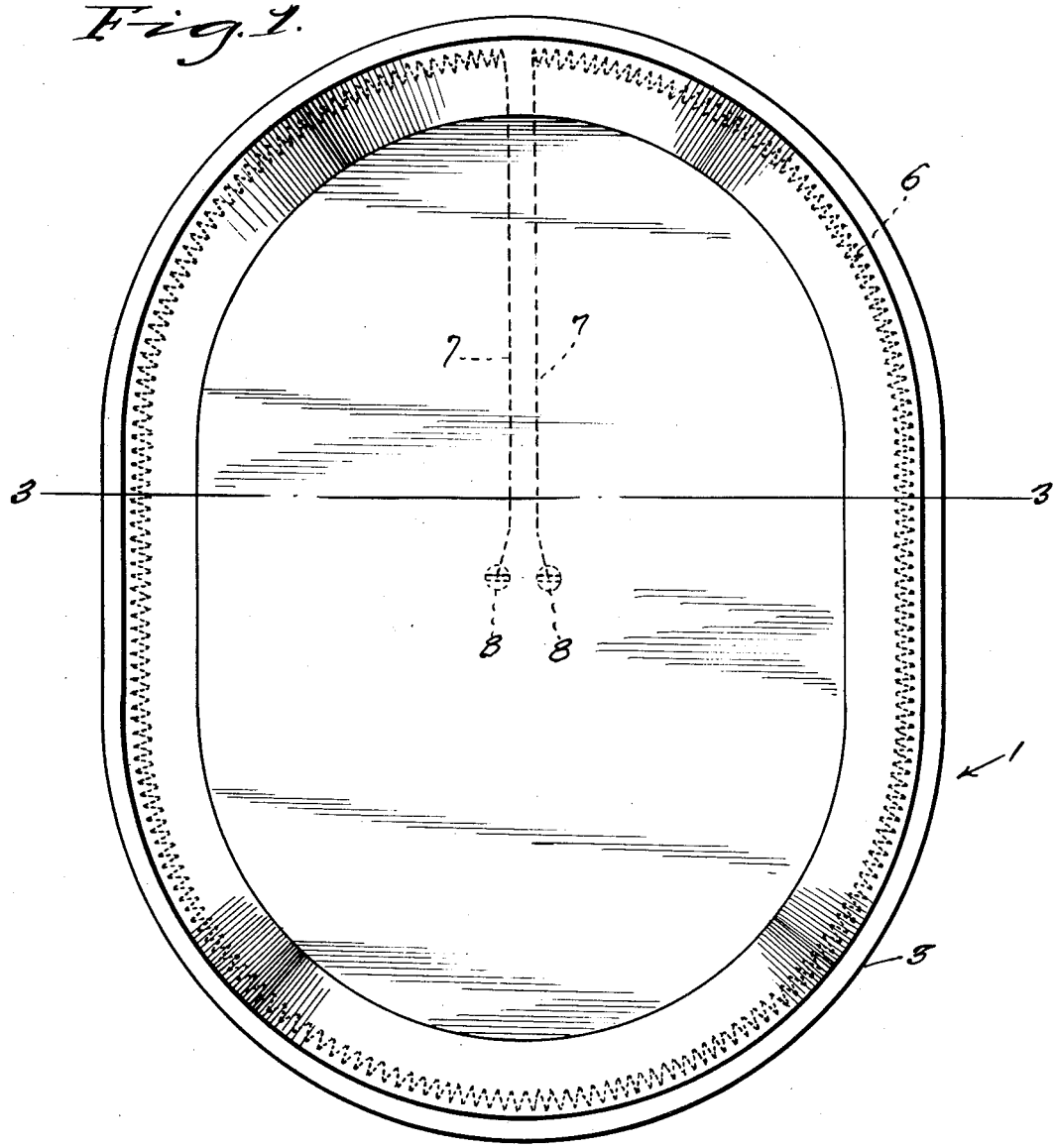

1,951,257

UNITED STATES PATENT OFFICE 1,951,257

PORTABLE ELECTRIC CHOCOLATE DIPPING PAN

Maurice L. Preston, St. Stephen, New Brunswick, Canada, assignor of one-half to Gordon F. Nicholson, St. Stephen, New Brunswick, Canada Application June 14, 1932, Serial No. 617,185

1 Claim. (Cl. 219—44)

This invention relates to a portable electric dipping pan for chocolates and the like, the general object of the invention being to provide means for keeping the chocolate at a fixed temperature while being worked by hand dippers on the dipping table, whereby a saving of the chocolate coating is effected with increased protection of the worker and in a uniform product of improved quality.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings, wherein like characters denote like or corresponding parts throughout the several views, and in which:—

Figure 1 is a plan view of the invention.

Fig. 2 is an end view thereof.

Fig. 3 is a section on line 3—3 of Fig. 1.

Fig. 4 is an enlarged fragmentary plan view with parts broken away.

As shown in these views, the device comprises an outer pan 1 having vertical side walls and an inner pan 2 having downwardly and inwardly sloping side walls with the top edges of the two pans connected together as shown at 3. Thus a space is formed between the pans which is preferably filled with powdered asbestos as shown at 4. A tube 5 of porcelain or the like extends through the space between the sides of the inner and outer pans and contains a heating coil 6, the ends of which are connected to the conductors 7 which extend inwardly under the bottom of the pan 2 to the terminal posts 8 arranged at the center of the pans and extending through the bottom of the outer pan.

Thus when current is applied to the heating element or coil 6, the inner pan is heated so that the chocolate or other material placed in the inner pan 2 will be kept at a desired even temperature which can be controlled by a thermostat or by a hand switch operated by the worker using the appliance.

By means of this invention confectionery centers may be dipped in the chocolate coating contained in the pan without waste, and always at the required temperature. There is no heat supplied to the bottom of the pan as such would cause the chocolate coating to turn gray. The process of building up walls of chocolate coating on a marble or metal dipping table, as at present practiced in the trade and which requires constant replenishing of the hot chocolate coating within the walls, is eliminated; resulting in a great saving of chocolate coating and in the time of the worker. The temperature of the air in the dipping room may be kept as required by considerations of sanitation and comfort, without any effect upon the temperature of the chocolate coating.

This appliance being portable, lends itself to use in either small candy kitchens or in large candy manufacturing establishments. The use of this appliance will result in a saving of chocolate coating; in increased production of the worker; and in a uniform product of improved quality.

It is thought from the foregoing description that the advantages and novel features of the invention will be readily apparent.

It is to be understood that changes may be made in the construction and in the combination and arrangement of the several parts provided that such changes fall within the scope of the appended claim.

Having thus described my invention, what I claim as new is:—

A chocolate dipping pan comprising an outer pan having a flat bottom, and vertical side walls, an inner pan having a flat bottom and upwardly and outwardly sloping side walls, means for connecting the upper edges of the two pans together, with the bottom of the inner pan spaced from the bottom of the outer pan, a filling of nonconductive material placed between the pans and entirely filling the space between the two pans, including the space between the side walls of the pans, and means for heating the sloping side walls of the inner pan without heating the bottom of said inner pan, such means consisting of an electric heating coil placed in said material and encircling the upwardly and outwardly sloping side walls of the inner pan, whereby heat is supplied to the contents of the inner pan at the sides thereof, and not at the bottom of the pan.

MAURICE L. PRESTON.